United States Patent [19]

De With et al.

[11] Patent Number: 4,841,195

[45] Date of Patent: Jun. 20, 1989

[54] DISCHARGE LAMP HAVING A YTTRIUM ALUMINUM GARNET DISCHARGE ENVELOPE

[75] Inventors: Gijsbertus De With; Hendricus J. A. Van Dijk, both of Eindhoven, Netherlands

[73] Assignee: U.S. Philips Corporation, New York, N.Y.

[21] Appl. No.: 598,959

[22] Filed: Apr. 11, 1984

[30] Foreign Application Priority Data

Apr. 29, 1983 [NL] Netherlands ................ 8301514

[51] Int. Cl.⁴ ..................... H01J 17/16; H01J 61/30
[52] U.S. Cl. ................................. 313/636; 501/152
[58] Field of Search ............... 313/636; 501/152, 153

[56] References Cited

U.S. PATENT DOCUMENTS

| | | | |
|---|---|---|---|
| 3,767,745 | 10/1973 | Gazza et al. | 264/65 |
| 4,174,973 | 11/1979 | Rhodes et al. | 501/152 |
| 4,182,972 | 1/1980 | Kaneno et al. | 313/636 |
| 4,331,627 | 5/1982 | Yamamoto et al. | 501/152 |
| 4,373,030 | 2/1983 | Kaneno et al. | 313/636 |

FOREIGN PATENT DOCUMENTS 564290 8/1977 U.S.S.R. .

OTHER PUBLICATIONS

Donoghue, "A Guide to Man-Made Gem Stones", pp. 163–165, 1982.
Phase Diagrams for Ceramists, 1969, Supplement FIGS. 2344, 2586.

*Primary Examiner*—Kenneth M. Schor
*Attorney, Agent, or Firm*—Emmanuel J. Lobato

[57] ABSTRACT

The invention relates to a high-pressure discharge lamp comprising a discharge envelope having a wall of ceramic translucent material consisting mainly of densely sintered polycrystalline yttrium aluminium garnet (YAG). According to the invention, the material of the wall of the discharge envelope contains a single phase of YAG and at least one of the substances MgO and $SiO_2$ in at total quantity of at least 50 ppm by weight, the absolute value of the difference between the $SiO_2$ and MgO contents being at least 50 ppm by weight, and an excess of MgO at most 1000 ppm by weight. It has been found that the material can be sintered without external pressure, and a lamp according to the invention can then be obtained comprising a discharge envelope having a satisfactory transluecence and a high resistance to attacks of filling constituents.

17 Claims, 1 Drawing Sheet

DISCHARGE LAMP HAVING A YTTRIUM ALUMINUM GARNET DISCHARGE ENVELOPE

BACKGROUND OF THE INVENTION

The invention relates to a high-pressure discharge lamp comprising a discharge envelope which accommodates an ionizable filling and two main electrodes, between which a discharge path extends, this discharge envelope having a wall of ceramic translucent material consisting mainly of densely sintered polycrystalline yttrium aluminium garnet, and to a method of manufacturing a high-pressure discharge lamp provided with a discharge envelope having a wall of such a material.

U.S. Pat. No. 3,767,745 discloses a high-pressure discharge lamp provided with a discharge envelope having a wall of translucent densely sintered polycrystalline yttrium aluminium garnet (yag). In the known lamp, the material of the wall of the discharge envelope is obtained by hot pressing. In this method, a starting material is sintered at a high temperature and at high pressure. A disadvantage of the method used is that it requires complicated apparatus. A very great disadvantage is that with the known method only tubular bodies, such as discharge envelopes, can be obtained, whose density is considerably less than 100% of the theoretical density. The translucence is determined to a great extend by the density and will be at an optimum with a density of 100%. Densities which are less than 98% of the theoretical density in practice lead to such a low translucence that a practical use as material for the wall of a discharge envelope is excluded.

SUMMARY OF THE INVENTION

The invention has for its object to provide a discharge lamp comprising a discharge envelope having a wall of a translucent ceramic material which does not suffer from the limitations of the known lamp. For this purpose, according to the invention, the lamp mentioned in the opening paragraph is characterized in that the material of the wall of the discharge envelope contains at least one of the substances MgO (magnesium oxide) and $SiO_2$ (silicon dioxide) in an overall quantity of at least 50 ppm by weight, the absolute value of the difference between the $SiO_2$ and MgO contents being at least 50 ppm by weight, and an excess of MgO being at most 1000 ppm by weight.

In the lamp according to the invention, it has been found that the material of the wall of the discharge envelope sintered without external pressure is fully gastight and has a satisfactory translucence. The translucence of the material of the wall of the discharge envelope of the lamp according to the invention is in fact comparable with or is even better than that of the polycrystalline densely sintered aluminium oxide generally known and used as the material of the wall of discharge envelopes. Moreover, it has been found that the material of the wall of the discharge envelope has a very high resistance to corrosive effects of, for example, sodium vapor.

It is supposed that the $SiO_2$ or MgO influences the crystal growth during sintering of the material, as a result of which the material according to the invention has a uniform crystal size. With a difference in absolute value between the $SiO_2$ and MgO contents of a polycrystalline yttrium aluminium garnet of less than 50 ppm by weight, there is a considerable probability that the crystal size is nonuniform, as a result of which the translucence will be adversely affected. It is further possible that the density of such a material will be less than the minimum required value of 98% of the theoretical density. An excess of MgO of more than 1000 ppm by weight may cause the phenomenon of segregation of a second phase to occur, which unfavourably influences the translucence, the mechanical strength as well as the resistance to corrosive effects. The resistance to corrosive effects is of particular importance because in frequently used high-pressure discharge lamps the ionizable filling comprises substances such as sodium amalgam and/or metal halides.

Russian Patent Specification No. 564,290 discloses the preparation of yttrium aluminium garnet by means of sintering in vacuo for obtaining laser material. For this purpose, the sintered material contains at contains at least 0.1% by weight of magnesium oxide. Such a quantity of magnesium oxide, however, leads in practice to the occurrence of segregation of a second phase in the sintered final product. Thus, the material formed becomes unsuitable for use as wall material of a discharge envelope of a high-pressure discharge lamp.

Preferably, the ceramic material of the wall of the discharge envelope in an embodiment of the lamp according to the invention contains 500–1500 ppm by weight of $SiO_2$. In another embodiment, the material preferably contains 100–500 ppm by weight of MgO. With contents of $SiO_2$ and MgO of at least 500 ppm by weight and 100 ppm by weight, respectively, in fact it has been found in practice that the material comprises crystals of a very uniform crystal size, as a result of which a homogeneous density and a high translucence are obtained. A uniform crystal size further favours the mechanical strength of the material. The contents of $SiO_2$ and MgO are preferably chosen to be no greater than 1500 ppm by weight and 500 ppm by weight, respectively, because above these values the phenomenon of segregation of a second phase may occur. The possibility of segregation of a second phase strongly increases with increasing contents by weight of the additions of $SiO_2$ and/or MgO.

Discharge envelopes for lamps according to the invention having a wall of polycrystalline yttrium aluminium garnet can be obtained by sintering $SiO_2$- and/or MgO containing mixtures of oxides of Y and Al, of mixed oxides of these metals or of compounds supplying these oxides on heating. Furthermore, these mixtures may contain a flux or melting salt.

A discharge envelope having a wall of ceramic translucent material of a lamp according to the invention is preferably manufactured by a method in which a powder mixture of mainly $Y_2(SO_4)_3$ and $Al_2(SO_4)_3$ is prepared by spray-drying an aqueous solution of the said sulphates, in that the powder mixture is heated in an oxidizing atmosphere at a temperature of 1150° C. –1400° C., a compound of Si and/or a compound of Mg being added before spay-drying or after heating the powder mixture, and in that the garnet powder thus obtained is then shaped preferably after disagglomeration into a desired moulding and in that the moulding thus obtained is sintered in vacuo at a pressure of at most 0.13 Pa or in hydrogen at a termperature of at least 1700° C.

In this description, the therm "vacuum" is to be understood to mean an atmosphere consisting mainly of air or an inert atmosphere like nitrogen gas or one or more of the rare gases at a pressure considerably lower than the atmospheric pressure.

In the method according to the invention, the Si is preferebly added to the acidified aqueous sulphate solution as ortho-ethyl silicate in a quantity equivalent to at least 100 ppm by weight of $SiO_2$ calculated with respect to the yttrium aluminium garnet to be formed. Such a quantity is the minimum quantity required for obtaining the desired material of the wall of a discharge envelope because it has been found that part of the $SiO_2$ can evaporate during the process. In the method according to the invention, the Mg is added before or after spray-drying, preferably as magnesium acetate in a quantity equivalent to at least 100 and at most 2000 ppm by weight of MgO calculated with repect to the yttrium aluminium garnet to be formed. In this manner it is achieved that the Si and the Mg become distributed homogeneously through the powder mixture of $Y_2(SO_4)_3$ and $Al_2(SO_4)_3$.

The powder mixture thus formed is preferably converted into yag powder by heating the power mixture in air for 2-10 hours. When heating in air, it is not necessary to take measures for influencing the atmosphere, which simplifies the process. In spite of this simplification, powder is obtained which consists only of the desired phase, i.e. yttrium aluminium garnet.

The yag powder obtained can thus be shaped into the desired moulding by pressing it isostatically. Another method of shaping the yag powder into the desired moulding is extrusion of a mixture of the yag powder with a binder, after which the moulding is heated at a temperature of 1000°-1400° C. in air. Process of isostatic pressing is known method of shaping mouldings, which is particularly suitable for mouldings of comparatively large dimensions. On the other hand extrusion is a particularly efficient method of manufacturing cylindrical mouldings in large numbers.

The moulding is preferably sintered in vacuo at a pressure of at most 0.13 Pa at a temperature of 1700°-1900° C. for 2-12 hours. thus, a product of high density is obtained having a satisfactory translucence and a uniform crystal size.

A vacuum at a pressure of more than 0.13 Pa leads to irregular crystal size distribution and a lower density of the moulding, as a result of which the translucence and also the mechanical strength are adversely affected.

Experiments have shown that sintering the moulding for obtaining a minimum desired density of 98% of the theoretical density requires a temperature of 1700° C., and it has further been found that this temperature can be maintained for 12 hours. When the temperature is increased during sintering, it has been found that the time in which the desired density is reached becomes shorter. Thus, experiments have shown that a density of 98% of the theoretical density is reached already after 2 hours at a temperature of 1900° C. It has been found that a further increase in temperature leads to such a rapid crystal growth that this results in an irregular crystal size distribution and hence in a reduced translucence. Further, the evaporation of the yttrium aluminium then begins to play a part.

BRIEF DESCRIPTION OF THE DRAWINGS

An embodiment of a lamp according to the invention will be described more fully with reference to the drawing, in which.

DETAILED DESCRIPTION OF THE INVENTION

Figure 1:
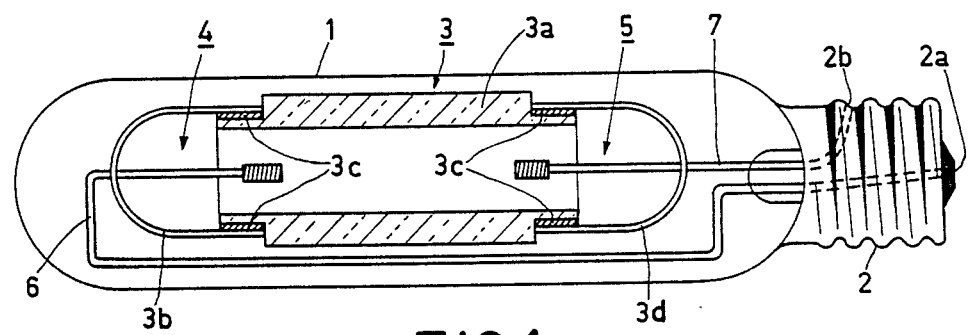
FIG. 1 shows in side view a lamp according to the invention.

In FIG. 1, reference numeral 1 denotes an outer bulb with a lamp cap 2. The outer bulb 1 encloses a discharge envelope 3. The lamp envelope 3 is composed of a cylindrical part 3a provided at both ends with sealing caps 3b and 3d hermetically sealed to the part 3a by means of melting glass 3c. the cylindrical part 3a has a wall formed from ytrrium aluminium garnet. The sealing caps 3b and 3d consist of niobium and are each provided with an electrode 4,5 of tungsten secured by means of a soldering connection. The electrode 4 is electrically connected via a current conductor 6 to a connection contact 2a of the lamp cam 2. The electrode 5 is electrically connected via a current conductor 7 to a connection contact 2b of the lamp camp 2.

The filling of the discharge envelope contains 15 mg of amalgam comprising 22% by weight of Na and 78% by weight of Hg. Moreover, this filling contains xenon at a pressure of 10.5 kPa at 300 K. The lamp is operated at a voltage of 220 V, 50 Hz, via a stabilization ballast having an impedance of 135Ω. The overall power dissipated by the lamp is 77 W with a light output of approximately 70 lm/W. The inner diameter of the discharge envelope is 3.3 mm and the electrode gap is 32 mm.

EXAMPLE 1:

The cylindrical part 3a of the lamp described is formed as follows. A quantity of $Al_2(SO_4)_3 \cdot 16H_2O$ was dissolved in de-ionized water until content of 28 mg of Al/g of solution was reached. Subsequently, $Y_2O_3$ was added to this solution while further diluting with water in such a manner that a stoichiometric ratio of Al and Y was reached. The pH of the solution was kept between 2.5 and 3.5 by the addition of $H_2SO_4$.

Ortho-ethyl silicate dissolved in $H_2SO_4$ was then added to this mixture, the quantity of Si being determined with reference to the yttrium aluminium garnet to be formed, corresponding to 2000 ppm by weight of $SiO_2$. The solution thus obtained was then spray-dried, after which the powder mixture obtained was heated in air to a temperature of approximately 1300° C. for 6 hours. Thus resulted in a powder consisting of a single phase, i.e. yttrium aluminium garnet having a specific surface area of 5 $m^2/g$. Subsequently, the powder was disagglomerated for approximately 8 hours.

A tubular moulding was obtained by extrusion of a mouldable mass containing the yag powder obtained in the manner described above in a binder system of tylose, butyl stearate and water. The moulding was dried in air and sawn to size. The the binder was baked out by heating the moulding for 4 hours in air at a temperature of 1250° C. After the baking-out process, the moulding was sintered in a vacuum of $1.3 \cdot 10^{-3}$ Pa. the temperature was brought to a value of 1400° C. in a period of 7 hours, was then kept constant for 9 hours, was the brought to 1800° C. in a period of 1.5 hours and kept constant for 4 hours, after which it was cooled at rate of 200° C./h. The cylindrical tube thus obtained consisted of crystals having an average crystal size of approximately 10 /μm and contained approximately 1000 ppm by weight of $SiO_2$.

EXAMPLE 2:

Another tubular moulding of the same composition as the preceding moulding was subjected to another sintering process. In this case, the temperature was continuously increased for approximately 12 hours to 1800° C., the temperature was kept constant and 1800° C. for 5 hours and the temperature was then continuously decreased for 6.5 hours. The cylindrical tube thus obtained contained also approximately 1000 ppm by weight of SiO₂ and consisted of crystals having a grain size of approximately 10 /μm. The optical properties of the two tubes were the same.

Figure 2:
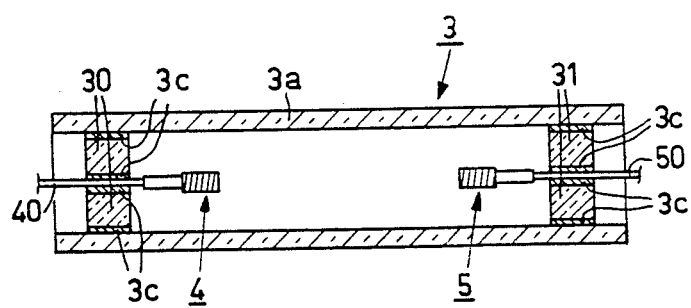
FIG. 2 shows a variation of the construction of a discharge envelope suitable for use in the lamp shown in FIG. 1.

Another lamp according to the invention, provided with a discharge envelope having the structure shown in FIG. 2. The cilyndrical part 3a of the discharge envelope 3 was provided at its ends with sealing stops 30,31 which were secured by means of melting glass 3c to the cylindrical part 3a in a gas-tight manner. A pinshaped lead-through conductor condector 40,50 of niobium was passed through each of the sealing stops 30,31 and was secured thereto by means of melting glass 3c in a gas-tight manner. Tungsten electrodes 4,5 were soldered to the lead-through conductors 40,50.

The filling of the discharge envelope contained 25 mg of amalgam comprising 22% by weight of Na and 78% by weigth of Hg. Besides, the filling contained xenon at a pressure of 2.5 kPa at 300 K. The lamp was operated at a voltage of 220 V, 50 Hz. The power consumed by the lamp amounted to 50 W and the luminous efficacy was 80 lm/W. The inner diameter of the discharge envelope was 3.5 mm and the electrode gap was 29 mm.

Both the wall of the cylindrical part 3a and the sealing stops 30,31 were formed from yttrium aluminium garnet containing MgO.

EXAMPLE 3:

The MgO-containing mouldings were manufactured for the major part in the same manner as the above described SiO₂-containing mouldings. The Mg was then added in a first case in the form of Mg acetate to and dissolved in the sulphate solution with the stoichiometric ratio of Al an Y. The quantity of Mg was chosen so as to correspond to 500 ppm by weight of MgO with respect to the yttrium aliminium garnet to be formed. With the mixture thus obtained, a sintered tube and sealing stops were formed by the aforementioned method. The mouldings were then kept at a temperature of 1730° C. for 2 hours during sintering. The increase in temperature was affected continuously in a period of 4 hours. With decreasing temperature, a forced cooling was carried out in 30 minutes to 1000° C., after which a natural cooling took place. The pressure during sintering was 1.3 10⁻³ Pa. the yttrium aluminium garnet of the tube and sealing stops obtained contained 250 ppm by weight of MgO and the average size of the crystals was approximately 20 /μm.

EXAMPLE 4:

In a second case of manufacturing a tubular moulding, the Mg was added after spray-drying in the form of Mg acetate to a slurry of stoichiometric yttrium aluminium garnet in ethanol, while a quantity of MgO corresponding to 500 ppm by weight with respect to yttrium aluminiun garnet was also added. Subsequently, the slurry formed was dried and heated to 550° C., during which process the Mg acetate dissociated. The dried material was then disagglomerated in the manner described and it was processed in an analogous manner to a sintered moulding. The temperature variation during sintering was then as follows; the moulding to be sintered was brought in a period of 6 hours to a temperature of 1700° C., was then brought in a period of 45 minutes to 1775° C. and was then kept for 4 hours at a constant temperature. Cooling took then place at a rate of approximately 250° C. per hour. The pressure during sintering was 1.3 10⁻³ Pa. In a tube thus formed, the yttrium aluminium garnet contained 250 ppm by weight of MgO and the average crystal size was approximately 5 /μm. The optical properties of the MgO-containing tubes corresponded to the those of the tubes containing SiO².

In order to illustrate the satisfactory translucence of the yttrium aluminium garnet according to the invention, the relative "in-line" transmission is measured and compared with that of polycrystalline densely sintered aluminium oxide. The absorption coefficient α according to the formula $$I/I_o = \exp(-\alpha d),$$

in which: It is the intensity of the radiation beam after transmission, $I_o$ is the intensity of the radiation beam before transmission, and d is the thickness over which transmission takes place, is then determined for a radiation beam having a wavelength of 589 nm which is in the visible range of light, at an angle of aperture of approximately 0.14 rad. For yttrium aluminium garnet containing 1000 ppm by weight of SiO₂, the value of α is 1.6 mm⁻³, while for yttrium aluminium garnet containing 250 ppm by weight of MgO this value is 0.7 mm⁻¹. For polycrystalline densely sintered aluminium oxide of a quality which is frequently used in practice, α has a value of 2.1 mm⁻¹. The translucence of the yttrium aluminium garnet according to the invention proves therefore to be better than that of the polycrystalline densely sintered aluminium oxide compared therewith.

What is claimed is:

1. In a high-pressure discharge lamp having a discharge envelope which accommodates an ionizable filling and two main electrodes between which a discharge path extends, said discharge envelope having a wall of ceramic translucent material consisting essentially of densely sintered polycrystalline yttrium aluminium garnet and at least one of the substances MgO and SiO₂ in a total quantity of at least 50 ppm by weight, the absolute value of the difference between the SiO₂ and MgO contents being at least 50 ppm by weight, and a excess of MgO being at most 1000 ppm by weight.

2. In a lamp as claimed in claim 1, the ceramic material of the wall of the discharge envelope further consists essentially of a quantity of 500 to 1500 ppm by weight of SiO₂.

3. In a lamp as claimed in claim 1, the ceramic material of the wall of the discharge envelope further consists essentially of a quantity of 100 to 500 ppm by weight of MgO.

4. In a discharge lamp having a light-transmissive discharge envelope, said discharge envelope comprising a single phase of densely sintered polycrystalline yttrium aluminium garnet and magnesium oxide in an amount of at least 50 ppm by weight and not exceeding 1000 ppm by weight.

5. In a discharge lamp according to claim 4, said discharge envelope having an absorption coefficient at visible wavelengths less than about 0.7 mm$^{-1}$.

6. In a discharge lamp according to claim 4 or 5, wherein magnesium oxide is present in an amount of about 100 to about 500 ppm by weight.

7. In a discharge lamp according to claim 4 or 5, wherein magnesium oxide is present in an amount of approximately 250 ppm by weight.

8. In a discharge lamp according to claim 4, said discharge envelope further comprising silicon dioxide as part of said single phase and in an amount of at least 50 ppm by weight, and differing from the amount of magnesium oxide by at least 50 ppm by weight.

9. In a discharge lamp according to claim 8, wherein silicon dioxide is present in an amount of about 500 to about 1500 ppm by weight.

10. In a discharge lamp according to claim 9, wherein silicon dioxide is present in an amount of about 1000 ppm by weight.

11. In a discharge lamp having a light-transmissive discharge envelope, said discharge envelope comprising a single phase of densely sintered polycrystalline yttrium aluminium garnet and silicon dioxide in an amount of at least 50 ppm by weight.

12. In a discharge lamp according to claim 11, said discharge envelope having a absorption coefficient at visible wagelenghs less than about 1.6 mm$^{-1}$.

13. In a discharge lamp according to claim 11 and 12, wherein silicon dioxide is present in an amount of about 500 to about 1500 ppm by weight.

14. In a discharge lamp according to claim 11 or 12, wherein silicon dioxide is present in an amount of about 1000 ppm by weight.

15. In a discharge lamp according to claim 11, said discharge envelope further comprising magnesium oxide as part of said single phase and in an amount of at least 50 ppm and not exceeding 1000 ppm by weight, and differing from the amount of silicon dioxide by at least 50 ppm by weight.

16. In a discharge lamp according to claim 15, wherein magnesium oxide is present in an amount of about 100 to about 500 ppm by weight.

17. In a discharge lamp according to claim 16, wherein magnesium oxide is present in an amount of about 250 ppm by weight.

* * * * *